M. L. GORHAM.
Cultivator.

No. 159,507.

2 Sheets--Sheet 1.

Patented Feb. 9, 1875.

Attest:

Inventor:
Marquis L. Gorham
By N. Cranford, atty.

M. L. GORHAM.
Cultivator.
No. 159,507. Patented Feb. 9, 1875.
2 Sheets--Sheet 2.
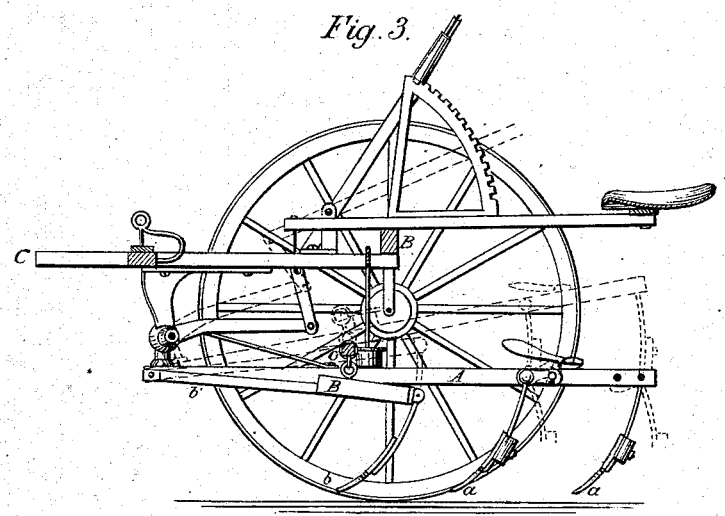
Fig. 3.
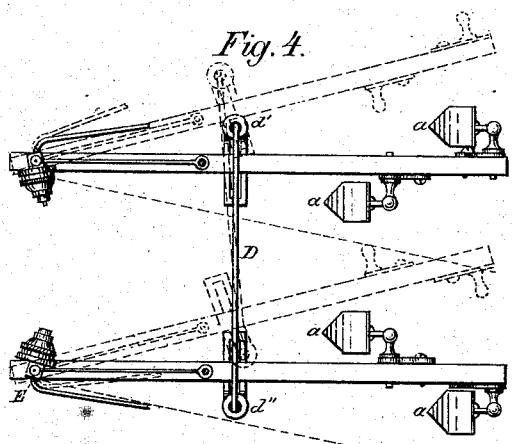
Fig. 4.
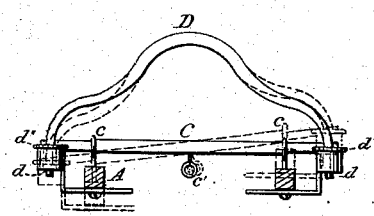
Fig. 5.
 Fig. 6. 
Attest:
Inventor:
Marquis L. Gorham
By N. Crawford
atty

UNITED STATES PATENT OFFICE.

MARQUIS L. GORHAM, OF ROCKFORD, ILLINOIS.

IMPROVEMENT IN CULTIVATORS.

Specification forming part of Letters Patent No. 159,507, dated February 9, 1875; application filed September 21, 1874.

*To all whom it may concern:*

Be it known that I, MARQUIS L. GORHAM, of Rockford, in the county of Winnebago, in the State of Illinois, have made certain Improvements in Cultivators; and especially as an improvement upon the cultivators patented to me December 5, 1871, No. 121,613, and September 1, 1874, No. 154,666, of which the following is a specification:

Ground that is plowed in the fall of the year, and especially where small grain is to be planted in the spring, needs only a shallow plowing before seeding, and cultivators are used for fallowing the ground for such purpose; and, as usually constructed, the plow cannot be brought to fallow the entire surface, because of the space between the plows for a corn-row to be passed between such plows, and one part of my improvement is designed to make a cultivator a complete fallow-plow, by which the entire surface of the ground is plowed.

Sway-bars, by which the drag-bars are held in horizontal position, have usually been attached to the axle or some other fixed part of the cultivator-frame, which rigid attachment is avoided by the construction in this improvement, and yet the sway-bar is kept in an upright position, and allows the drag-bars to have freedom of vertical and lateral movement; and the invention consists in the construction and arrangement of the parts that effect the purposes by which the above results are accomplished, as will be fully hereinafter described.

Figure 1:
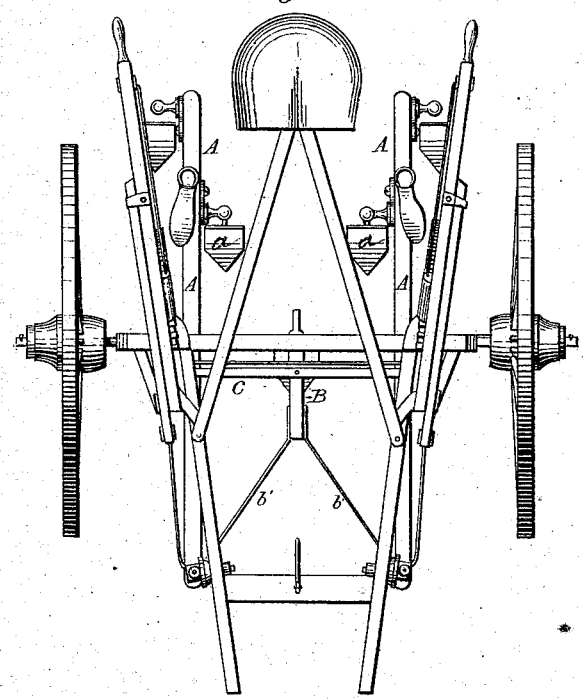
Figure 2:
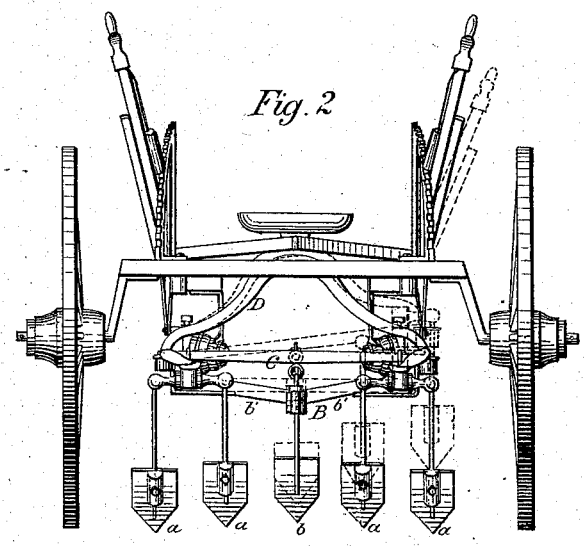

In the drawings, Figure 1 is a plan view of the cultivator; Fig. 2 a rear view, Fig. 3 an upright sectional side view, Fig. 4 a top view, of drag-bars and attachments, and Figs. 5 and 6 detail of parts.

The construction of the cultivator is the same as in my former patents, as above cited, having the wheels, axles, tongue, hinged drag-bars, and appliances for raising and lowering them, the same as in those patents. As the improvements to be described are attached to and affect the drag-bars, the description commences with them.

A A represent the drag-bars hinged at their forward ends to brackets attached to either side of the tongue of the cultivator, so that the drag-bars and the shovels $a$ can be raised vertically or swayed laterally. B is a removable auxiliary plow beam or bar, centrally located between the drag-bars A, and has a plow, $b$, attached thereto, and is attached to the drag-bars A by the angling braces $b'$ $b'$, that are fast at their rear ends to the beam B, and their forward ends bolted near to the forward ends of the drag-bars, while the rear end of the beam B is held by the yoke C that goes laterally over the drag-bars A, and is loosely fitted in eyebolts $c$ $c$ in drag-bars A at either end, so that the yoke C can work in the eyebolts, and allow either one of the two drag-bars to be raised without raising the other. $c'$ is an eyebolt, passing centrally and vertically through the yoke C, and swivels into another eyebolt, $c''$, in the rear end of beam B, and so that the beam B, at its rear end, and its shovel $b$, are supported by the yoke C. D is a sway-bar, arched upward in the center of its length, with its lower ends, $d$, rounded to enter into adjustable sockets $d'$ and $d''$, as seen in Fig. 5, and in which the ends of the sway-bar will allow either of the drag-bars to be raised, and preserve its perpendicular or upright position in other respects. The sockets $d'$ and $d''$ are adjusted upon the drag-bars A by a slot in the horizontal arm of the sockets, and a holding-screw passing through the slot into the drag-bar, and holding the socket to the proper adjustment upon the drag-bar, which adjusts the drag-bars to the proper distance apart, while the sockets that receive the ends of the sway-bar remain at the exact point determined by the length of the sway-bar. Socket $d'$ has a round hole on its top side, and from that point is enlarged in every direction to be coniform, or larger in diameter on its lower opening than on the top, as seen at Fig. 6, $d'$ $d'$.

This construction will allow the socket $d'$ to freely change its position, with relation to the end $d$ of the sway-bar, so that the drag-bar upon which it is attached can be raised or lowered without affecting the other drag-bar.

Socket $d''$ has the same form at its top side, while the opening is enlarged only laterally, or parallel with the position of the sway-bar, as seen in Fig. 6 at $d''$ $d''$.

This construction of socket $d''$ allows the drag-bars to be raised or lowered independently of each other, while the sway-bar is kept in a position at right angles to the plane of the drag-bars without attaching the sway-bar rigidly or adjustably to any fixed part of the cultivator, and allows of a more flexible connection between the two drag-bars than where the sway-bar is fixed, and so that the plows in the drag-bars can more easily accommodate themselves to any uneven surface of the ground. This removable central beam and its plows changes the ordinary straddle-row cultivator into a fallow gang-plow at small expense, and gives to the cultivator a new use.

Having thus described my invention, what I claim is—

1. The removable center-beam B, with its plow $b$, hinged to yoke C by the swivel-joint formed by eyebolts $c'$ and $c''$, and attached loosely to drag-bars A by the yoke C and eyebolts $c$, combined and operating substantially as and for the purposes described.

2. The free sway-bar D, with its terminal ends $d$, in combination with the sockets $d'$ $d''$, constructed as described, and adjustable on drag-bars A of a cultivator, substantially as and for the purposes described.

MARQUIS L. GORHAM.

Witnesses:
J. MASON GOSZLER,
C. I. FRITZ.